United States Patent [19]

Witenhafer et al.

[11] 4,117,216
[45] Sep. 26, 1978

[54] INVERSION POLYMERIZATION PROCESS FOR PRODUCING VINYL RESINS

[75] Inventors: Donald Edward Witenhafer, North Olmstead; David Thomas Popovich, Lorain, both of Ohio

[73] Assignee: The B. F. Goodrich Company, Akron, Ohio

[21] Appl. No.: 830,308

[22] Filed: Sep. 2, 1977

[51] Int. Cl.$^2$ .......................... C08F 2/18; C08F 2/32; C08F 14/06
[52] U.S. Cl. ........................................ 526/62; 526/74; 526/344.2
[58] Field of Search ............................. 526/62, 74

[56] References Cited
U.S. PATENT DOCUMENTS

| | | | |
|---|---|---|---|
| 3,515,709 | 6/1970 | Nelson et al. | 526/62 |
| 3,669,946 | 6/1972 | Koyanagi et al. | 526/62 |
| 3,778,423 | 12/1973 | Reiter | 526/62 |
| 3,804,924 | 4/1974 | Papetti et al. | 526/74 |
| 3,915,944 | 10/1975 | Burgess et al. | 526/62 |
| 4,007,320 | 2/1977 | Petersen | 526/74 |
| 4,024,301 | 5/1977 | Witenhafer et al. | 526/62 |

*Primary Examiner*—Alan Holler
*Attorney, Agent, or Firm*—Roy P. Wymbs

[57] ABSTRACT

This invention relates to a process of producing vinyl polymers by an inversion polymerization technique in the presence of a coating on the internal surfaces of the polymerization reactor. By inversion polymerization is meant conducting the initial stage of the polymerization reaction wherein the monomer or monomers being polymerized constitute the continuous phase and in the latter stage of polymerization, water constitutes the continuous phase. The coating is comprised of a water-soluble suspending agent, such as an alkyl or alkyl hydroxyalkyl cellulose ether. By means of the present inventive process, polymer buildup on the internal surfaces of the reactor are reduced.

8 Claims, No Drawings

INVERSION POLYMERIZATION PROCESS FOR PRODUCING VINYL RESINS

BACKGROUND OF THE INVENTION

In the prior art, and particularly British Pat. No. 748,727, there is described an inversion polymerization process. The process described therein comprises forming an initial conversion of monomer to polymer of up to 20% by mass polymerization of the monomer in the presence of a suitable catalyst. In this portion of the polymerization, the monomer is the continuous phase. Thereafter, sufficient water is added to the polymerization system to cause a phase inversion wherein the water becomes the continuous phase forming a dispersion of the unpolymerized monomer in the water. This dispersion is then polymerized to convert essentially all of the remaining monomer to solid polymer. However, the disadvantage of such process is that polymer buildup on the walls of the reactor or "poly" is excessive and requires cleaning after each batch or run is made. Further, after several runs are made it is necessary for an operator to enter the reactor and scrape the buildup from the surfaces which presents a health hazard as well as economic difficulties.

In U.S. Pat. No. 3,706,722 there is described an inversion polymerization process for producing polymers having improved uniformity in porosity, size and structure. This the patentees accomplish by incorporating a nonionic, monomer-soluble surface active agent in the initial continuous monomer phase. While producing a more porous polymer, the polymer buildup is still a problem and detracts from the use of said process on a commercial basis. This is particularly true when producing polymers and copolymers of vinyl chloride where the buildup problem and health hazard are most acute.

Accordingly, there is a great need to produce polymers having uniform porosity, size and structure by the inversion polymerization procedure which procedure would substantially eliminate polymer buildup.

SUMMARY OF THE INVENTION

We have unexpectedly found that if the inversion polymerization process is run in a reactor having the proper coating on the inner surfaces thereof, polymer buildup on said surfaces is substantially eliminated. Further, the uniform porosity, size and structure of the polymer particles is not affected by the presence of said coating. The inner surfaces of the reactor are coated with a coating which is comprised of a water-soluble suspending agent, such as an alkyl or alkyl hydroxyalkyl cellulose ether. The coating is dissolved off the surfaces, and any polymer buildup along with it, when, in the second stage of the polymerization reaction, water is the continuous phase.

DETAILED DESCRIPTION

In preparing the polymers of the instant invention, the first step comprises forming an initial continuous phase of monomer or monomers, which phase contains essentially all of the monomer or monomers to be polymerized. The monomer phase is then polymerized to a conversion of monomer(s) to polymer of between about 1 and about 20 percent and preferably between about 5 and 12 percent. In this first step or stage the monomers are polymerized in mass. However, a water-in-monomer dispersion may be employed, the monomers still being the continuous phase. When using the water-in-monomer dispersion about 0.1% by weight, based on the weight of the water, of a water-soluble suspending agent is employed and the monomer is unifomly mixed with at least about 0.01% by weight and preferably between about 0.1 and about 1.0% by weight, based on the weight of the monomer, of a monomer-soluble dispersing agent, and between about 0.1 and about 0.5% by weight of a monomer-soluble polymerization initiator.

In the second stage of the inversion polymerization process, the water containing a water-soluble suspending or dispersing agent is added to the water-in-monomer dispersion or initially mass polymerized monomer. The water solution can be added in any suitable manner. The water solution is added in such an amount so as to give the desired concentration of monomer for final polymerization purposes. In this final polymerization stage, water constitutes the continuous phase.

The monomer-soluble dispersing agents for use in the inversion polymerization process are the nonionic monomer-soluble esters of fatty acids with glycerol, sorbitol and their polyoxyethylene derivatives and the nonionic, monomer-soluble multi-valent metal salts of fatty acids, alkyl sulfonates and sulfates. As examples of such dispersing agents there may be named sorbitan monostearate, sorbitan tristearate, glycerol monooleate, glycerol monostearate, glycerol monopalmitate, sorbitan monooleate, and the like, calcium dilauryl sulfate, zinc dilauryl sulfate, barium distearyl sulfonate, aluminum trilauryl sulfate, and the like.

As examples of the water-soluble suspending agents are the water-soluble alkyl or hydroxyalkyl alkyl cellulose ethers wherein the alkyl group contains from 1 to 2 carbon atoms and the hydroxyalkyl groups contain from 2 to 4 carbon atoms. Any viscosity grade of the cellulose ethers may be used but it is preferred to use the lower viscosity grades, such as about 10 cps to about 400 cps. By viscosity grade is meant the viscosity of a 2% aqueous solution of the cellulose ether measured at 20° C. The low viscosity grades of methyl cellulose and hydroxy-propyl methyl cellulose are preferred cellulose ethers since they are easily dissolved in water.

The monomers employed in the inversion polymerization process are the essentially water-insoluble, ethylenically unsaturated liquid monomers which form polymers which are insoluble in their monomers. Examples of such monomers are the vinyl halides, such as vinyl chloride, vinyl bromide, the vinylidene halides, such as vinylidene chloride, the vinyl alkanoates, such as vinyl acetate, acrylonitrile, and mixtures of said monomers. Other ethylenically unsaturated monomers may be used in admixture with the above monomers so long as such admixtures remain essentially insoluble in water and form polymers which are insoluble in their monomers. The most useful monomer in the inversion polymerization process is vinyl chloride and the invention will be described hereinafter in connection therewith, it being understood that this is not intended in a limitative sense.

In the polymerization of the monomers a monomer-soluble free radical producing catalyst or initiator is employed. Examples of such catalysts are di-secondary butyl peroxydicarbonate, isopropyl peroxypercarbonate, lauroyl peroxide, and the like. Any of the known monomer soluble catalysts may be used which those skilled in the art are familiar with. The polymerization reaction is conducted at a temperature in the range of about 30° C. to about 80° C.

In the practice of the present invention, the inversion process is conducted in a reactor which has been previously coated with a water-soluble coating. The coating, which is an aqueous solution of a water-soluble suspending agent, is applied by spraying or brushing on and the excess drained from the reactor. It is not necessary to dry the coating and the reactor can be charged immediately. However, the coating can be dried before charging the reactor. Whether or not the coating is dried, care must be taken to not prematurely remove the coating by getting water directly in contact with the wall. As examples of water-soluble suspending agents, useful as a coating in the present invention, there may be named methyl cellulose, hydroxypropyl methyl cellulose, polyvinyl alcohol, polyethylene oxide, polyvinyl pyrrolidone, and the like In the first stage of the polymerization when the monomer constitutes the continuous phase, the coating is insoluble in said phase and substantially prevents the buildup of polymer on the internal surfaces of the reactor. In the second stage of the reaction when the water constitutes the continuous phase, the coating is dissolved off the surfaces into the reaction medium. If any polymer buildup has occurred during the first stage, it is removed into the reaction medium when the coating is dissolved. Surprisingly, we have found that what little polymer buildup occurs on the coating during the first stage does not affect the finished polymer quality even though removed into the reaction medium. Any large "sandy" buildup polymer particles would, in any event, be separated when the polymer is screened after passing through the dryer.

In the coating the suspending agent is employed in a concentration in the range of about 0.05% to about 10% by weight. Preferably, a concentration in the range of 0.5% to 5% by weight is used. The concentration will depend in great part upon the molecular weight of the suspending agent being employed. For example, a 3% by weight solution of hydroxypropyl methyl cellulose in water is very satisfactory.

The coating solution of the present invention is made by conventional methods, using heat and agitation where necessary.

In order to further illustrate the present invention, the following specific example is given. It is to be understood, however, that this is merely intended in an illustrative and not in a limitative sense. In the example, all parts and percents are be weight unless otherwise indicated.

EXAMPLE I

In this Example the inner surfaces of the reactor were coated with a coating of a 3% aqueous solution of hydroxpropyl methyl cellulose and allowed to drain. The excess coating solution was removed from the reactor. Then 0.68 part of sorbitan monostearate, based on 100 parts of monomer, was charged to the reactor. The reactor was then evacuated to 27 inches of mercury. Then 0.02 part per hundred monomer of a 20% solution of di-secondary butyl peroxydicarbonate in hexane was charged to the reactor followed by 100 parts of vinyl chloride. The reactor was heated to 52° C. at about 120 psig. pressure. Then 40 parts of demineralized water containing 0.04 part hydroxypropyl methyl cellulose was added over a period of 15 minutes with agitation in a manner to avoid direct contact with the wall. The first stage polymerization was continued with agitation for a period of one hour or to a conversion of monomer to polymer of about 8%.

After the first stage, 160 parts of demineralized water containing 0.16 part of hydroxypropyl methyl cellulose was metered into the reactor over a period of one hour. Thereafter, the polymerization reaction was continued in the second stage with water being the continuous phase until the pressure in the reactor reached 90 psig. This resulted in a total conversion of about 85%. The polymer was removed and dried in the usual manner. Upon removal of the polymer or polymer slurry, the inner surfaces of the reactor were examined and found to be essentially free of polymer buildup. That is, the buildup was considerably less than that which is formed when no coating is used. The polymer so produced had large and uniform particle size and had high porosity as evidenced by its ability to readily absorb plasticizer.

Coating of the internal surfaces of the polymerization reactor with a coating, in accordance with the present invention, for use with the inversion polymerization process substantially reduces polymer buildup on said surfaces. This results in increased production over a unit period of time. The polymer buildup, if any, in the first stage or the monomer continuous phase is removed into the reaction medium by dissolution of the coating and in those instances where a little polymer buildup does accumulate on the interior surfaces, it is not of the hard, rough, difficult-to-remove type and is easily removed without employing the difficult and tedious scraping methods that have heretofore been necessary in the art. Further, the polymers produced in accordance with the present invention are of a highly uniform size, shape and porosity. These polymers have improved bulk density, low gel content and good flow characteristics. The polymer particles are capable of enhanced, uniform, plasticizer absorption. Numerous other advantages of the present invention will be apparent to those skilled in the art.

While the present invention has been described in terms of its specific embodiments, certain modifications and equivalents will be apparent to those skilled in the art and are intended to be included within the scope of the invention, which is to be limited only by the scope of the appended claims.

We claim:

1. In a process of inversion polymerizing substantially water-insoluble polymerizable ethylenically unsaturated monomer(s) in a reaction vessel by first forming a continuous monomer(s) phase in the presence of a monomer-soluble surface active agent and a monomer-soluble catalyst, polymerizing said monomer phase at a temperature in the range of about 30° C. to about 80° C. with agitation until a conversion to polymer less than about 20% occurs, adding sufficient water to the monomer-polymer mixture with agitation and in the presence of at least about 0.1% by weight of a water-soluble suspending agent for said monomer(s) to form a dispersion wherein water is the continuous phase, then polymerizing the dispersion at a temperature in the range of about 30° C. to about 80° C. to convert the remaining monomer(s) to polymer, the improvement which comprises (1) applying a coating to the internal surfaces of said reaction vessel, comprised of a water-soluble suspending agent, (2) polymerizing the continuous monomer phase in constant contact with said coating, and (3) polymerizing said continuous water phase in constant contact with said coating while dissolving said coating in the continuous water phase, whereby polymer buildup on said internal surfaces is substantially reduced.

2. A process as defined in claim 1 wherein the coating is an alkyl hydroxyalkyl cellulose ether.

3. A process as defined in claim 1 wherein the continuous monomer phase is a water-in-monomer dispersion.

4. A process as defined in claim 1 wherein the monomer is vinyl chloride.

5. A process as defined in claim 1 wherein the monomer-soluble surface active agent is selected from the group consisting of nonionic esters of fatty acids with glycerol, sorbitol and their polyoxyethylene derivatives and nonionic multi-valent metal salts of fatty acids, alkyl sulfonates and sulfates.

6. A process as defined in claim 1 wherein the coating is hydroxypropyl methyl cellulose.

7. A process as defined in claim 5 wherein the surface active agent is sorbitan monostearate.

8. A process as defined in claim 2 wherein the coating is hydroxypropyl methyl cellulose.

* * * * *